(12) United States Patent
Porte et al.

(10) Patent No.: US 6,443,395 B1
(45) Date of Patent: Sep. 3, 2002

(54) AIR INLET COWL FOR A JET ENGINE EQUIPPED WITH DE-ICING MEANS

(75) Inventors: Alain Porte, Colomiers (FR); Stéphane Viala, Montjoire (FR); Olivier Barbara, Toulouse (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 09/924,460

(22) Filed: Aug. 9, 2001

(30) Foreign Application Priority Data

Sep. 6, 2000 (FR) .............................................. 00 11337

(51) Int. Cl.[7] ................................................ B64D 15/00
(52) U.S. Cl. .................................. 244/134 R; 244/53 B; 60/39.093
(58) Field of Search ............................ 244/134 R, 134 B, 244/53 B; 60/39.093

(56) References Cited

U.S. PATENT DOCUMENTS

| | | | | |
|---|---|---|---|---|
| 4,688,745 A | * | 8/1987 | Rosenthal Herman A. | 244/134 R |
| 6,131,855 A | * | 10/2000 | Porte | 244/134 B |
| 6,267,328 B1 | * | 7/2001 | Vest | 239/599 |
| 6,354,538 B1 | * | 3/2002 | Chilukuri | 244/134 B |

OTHER PUBLICATIONS

French Novelty Search Report dated May 23, 2001.

* cited by examiner

Primary Examiner—J. Woodrow Eldred
(74) Attorney, Agent, or Firm—Stevens, Davis, Miller & Mosher, LLP

(57) ABSTRACT

Air inlet cowl for a jet engine equipped with deicing means.

According to the invention, the hollow leading edge (16) of said cowl (9) comprises a mixer (19) for forming, at each moment, a mixture of the stream of hot air (20) being injected and some, previously injected, of the stream of air that is recirculating. This evens out the temperature inside said leading edge (16), eliminating hot spots and optimizing the de-icing.

9 Claims, 5 Drawing Sheets

AIR INLET COWL FOR A JET ENGINE EQUIPPED WITH DE-ICING MEANS

The present invention relates to the de-icing of air inlet cowls of jet engines, particularly aircraft engines.

It is known that, if need be (to prevent the formation of ice or to remove ice which has already formed), the leading edge of the air inlet cowl of such engines is de-iced by heating it with pressurized hot air tapped from said engine and conveyed to said leading edge by a pressurized hot air circulation circuit.

To this end, such an air inlet cowl comprises, in the known way:

- a hollow leading edge delimiting an internal annular peripheral chamber, closed by an internal partition (or bulkhead) and provided with at least one orifice placing said annular chamber in communication with the outside; and
- a hot air supply pipe capable of being connected, at its rear end away from said leading edge, to a pressurized hot air circuit and, at its front end towards said leading edge, to an injector injecting a stream of said pressurized hot air into said annular chamber.

Thus, said stream of hot air flows through said annular chamber, heating it, before escaping to the outside through said communication orifice.

It has been found, in known cowls of this type, that the heating was not uniform in said annular chamber. This was because, near said injector, the walls of said annular chamber are raised to a very high temperature (several hundred degrees Celsius) whereas the regions of this chamber remote from said injector are subjected to relatively low temperatures. What this then means is that there is a risk that the walls of said annular chamber near the injector might be damaged, where as de-icing is not optimal in said regions remote from the injector.

It is an object of the present invention to overcome these drawbacks.

To this end, according to the invention, the air inlet cowl for a jet engine, particularly for an aircraft, provided with means for de-icing its leading edge and for this purpose comprising:

- a hollow leading edge delimiting an internal annular peripheral chamber, closed by an internal partition and provided with at least one orifice placing said annular chamber in communication with the outside; and
- a hot air supply pipe capable of being connected, at its rear end away from said leading edge, to a pressurized hot air circuit and, at its front end towards said leading edge, to an injector injecting a stream of said pressurized hot air into said annular chamber so that said stream of hot air flows through said annular chamber, heating it, before escaping to the outside through said communication orifice, is noteworthy in that:

- said communication orifice is calibrated to allow only some of said stream of hot air flowing through said annular chamber to escape to the outside, the rest of said stream being recirculated in this annular chamber; and inside said annular chamber, there is a mixer for forming, at each moment, a mixture of the stream of hot air being injected by said injector with the part of said previously injected stream of air that is recirculating.

Thus, the present invention makes it possible to even out the temperature of the stream of air flowing through the annular chamber with, as a consequence, elimination of the hot spots near the injector and better de-icing of those parts of the leading edge of the cowl which are remote from this injector.

In one particularly simple embodiment, said mixer may have a particular elongate shape, preferably the shape of a tube, the two ends of which are open, said mixer, at its upstream end arranged facing said injector, receiving both said stream of hot air being injected and said part of said stream of air that is recirculating, and delivering mixture at its downstream end, away from said injector.

It will be noted that, in the context of the present invention, said mixer may have any shape that makes it possible to obtain a uniform mixture of said two streams.

As a preference, in order to be easily housed in said annular chamber, said mixer is curved into a portion of an annulus, to correspond to the shape of said internal annular peripheral chamber.

To increase still further the uniformity in terms of temperature of the stream of hot air flowing through said annular chamber and therefore improve the efficiency of the de-icing while at the same time more effectively eliminating hot spots, it is advantageous for said mixer to comprise means for causing said mixture of hot air stream to effect a swirling rotation in the manner of a cyclone. Thus, said stream of hot air passes through said annular chamber with a swirling motion.

Although said means for inducing swirl in said mixture of hot air may consist of vanes or blades arranged inside said mixer, it is advantageous for them to be able to use the energy of the hot air conveyed by said supply pipe.

To this end, said swirl-inducing means may comprise at least one auxiliary hot air injector arranged laterally and tangentially with respect to said mixer, downstream of the aforesaid injector. In this case, it is advantageous for said auxiliary injector to be supplied with hot air by a tapping off said supply pipe. The position of said auxiliary injector along the mixer, and the angle of inclination of the axis of said auxiliary injector to the axis of the mixer are parameters that can be used to adjust the swirl of the mixture of the streams of hot air. The number of auxiliary injectors used is also one such parameter.

In addition, the opening of the auxiliary injector or injectors in the region of the mixer preferably has a rectangular or elongate shape. This makes it possible to generate an auxiliary stream which has a higher pressure than the main stream, which improves the uniformity of the mixture and the swirl induced in the stream.

As an alternative, said means for causing the mixture of stream to swirl comprise at least one auxiliary hot air injector arranged in the region of the aforesaid injector. This or these auxiliary injector(s) may then be supplied with hot air directly by said supply pipe, as is the case of the aforesaid injector. It is then advantageous for the auxiliary injector(s) to form an integral part of the aforesaid injector.

Furthermore, said injector, which may be a part integral with or a part separate from the mixer, of any shape, is preferably arranged in the first half of the mixer.

It will be readily understood that, by virtue of the present invention, the thermal stresses experienced by the materials of which the leading edge is made are not as high whereas the de-icing efficiency is better. It is therefore possible to make said leading edge using more lightweight and less expensive materials and to reduce the temperature of the air tapped from the engine. As a consequence, the fuel consumption of said engine is reduced.

The figures of the appended drawing will make it easier to understand how the invention may be embodied. In these figures, identical references denote similar elements.

Figure 1:
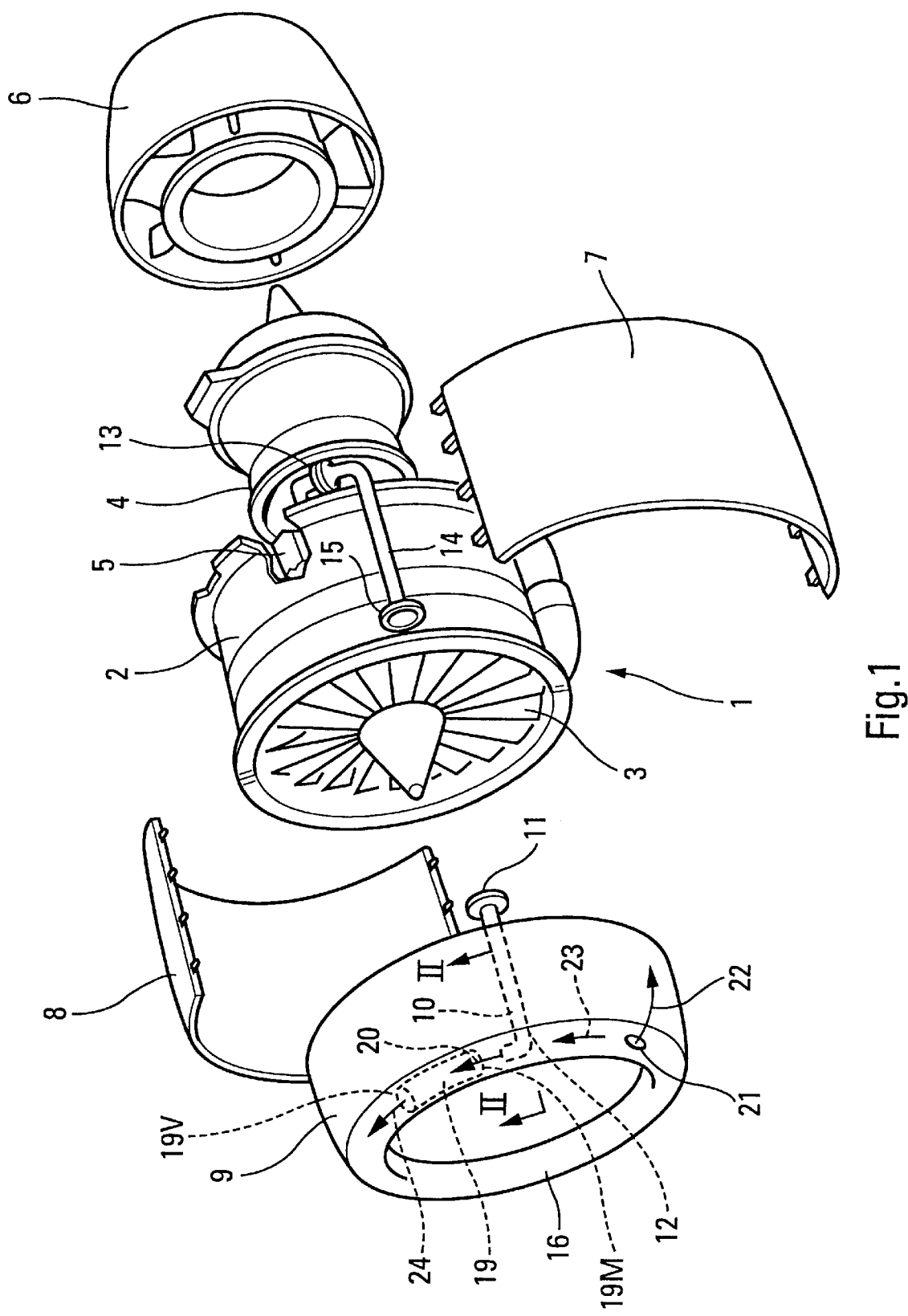
FIG. 1 shows schematically, in exploded perspective, an aircraft jet engine and its various cowlings, said engine being provided with an air inlet cowl according to the present invention.

The bypass engine 1 depicted schematically in FIG. 1 comprises, in the known way, a central hot-air generator 2, a fan 3 and compressor stages 4 and is provided with an attachment 5 for suspending it from a support pylon (not depicted). Associated with and fixed to the engine 1 are a jet pipe assembly 6, two lateral cowls 7 and 8, and an air inlet cowl 9.

As illustrated schematically in FIG. 1, the air inlet cowl 9 has an internal pipe 10 provided at its rear end, facing toward the engine 1, with a coupling element 11 and at its front end, lodged in the hollow leading edge 16 of said air inlet cowl, with an injector 12. Moreover, arranged on a compressor stage of the engine 1 is a pressurized hot air tapping 13 which is connected to a pipe 14 provided, facing the coupling element 11 of the pipe 10, with a complementary coupling element 15.

Thus, when the complementary coupling elements 11 and 15 are connected together, pressurized hot air tapped at 13 from the engine 1 is conveyed by the pipes 14 and 10 to the injector 12.

Figure 2:
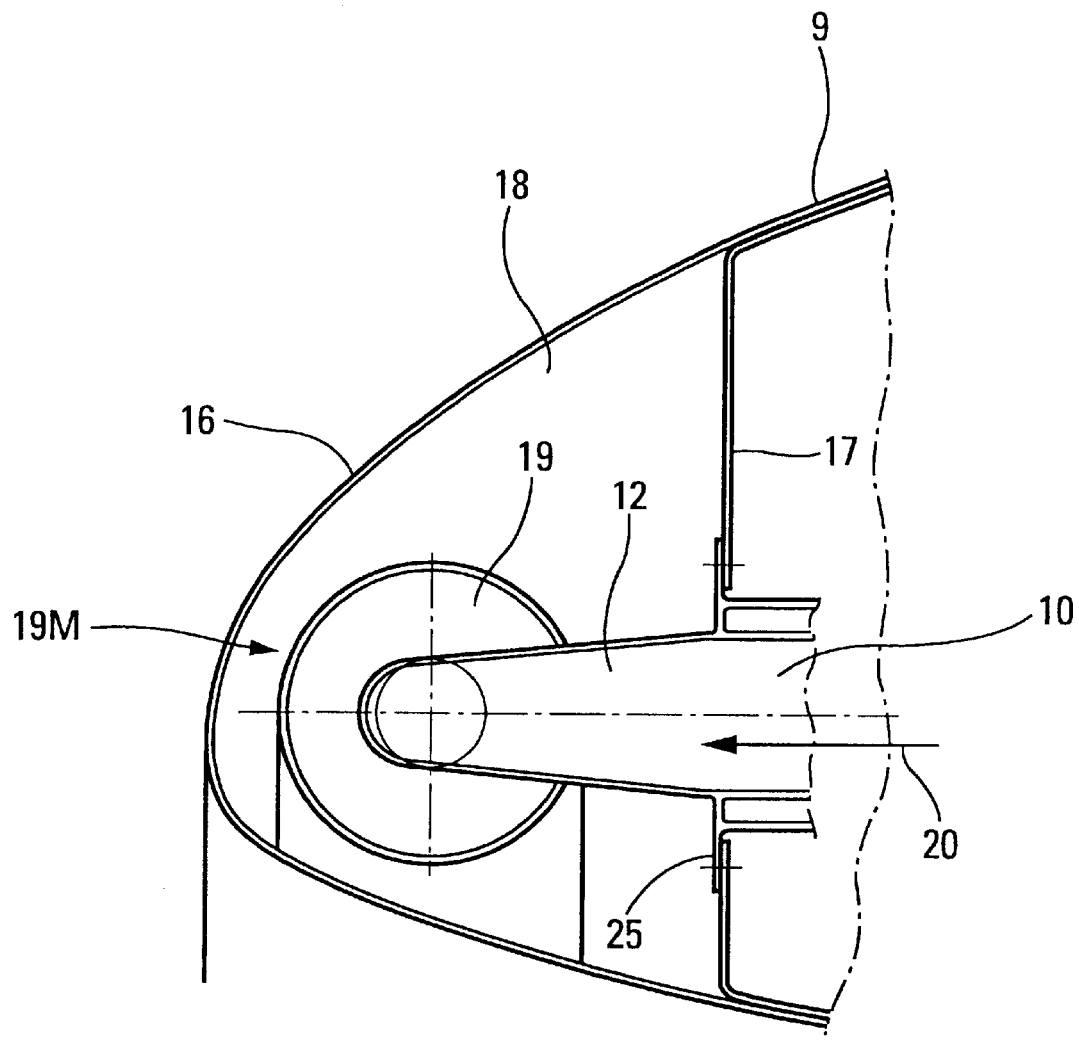
FIG. 2 is an enlarged cross-section of the internal annular peripheral chamber of this cowl, at the hot air injector, this section corresponding to the line II—II of FIG. 1, passing through the axis of the hot air supply pipe.

As shown in detail and on a larger scale by the half cross-section of FIG. 2, the hollow leading edge 16 is closed at the rear end by an internal partition 17, so that an internal annular peripheral chamber 18 is formed inside said leading edge 16. The injector 12 passes through said internal partition 17 and is elbowed to open into the annular chamber 18 parallel to the leading edge 16. This injector 12 is secured to a flange 25 allowing it to be fastened onto the internal partition 17.

According to the present invention, inside said annular chamber 18 and downstream of said injector 12, the cowl 9 comprises a mixer 19, which is elongate and arranged parallel to said leading edge 16. The mixer 19 is advantageously formed by a tube which is open at both ends 19M and 19V and curved into the shape of a portion of an annulus, to correspond with the shape of the annular chamber 18.

The injector 12 injects into the mixer 19, through the upstream end 19M thereof, a stream of hot air 20 which it receives from the pipe 10. Thereafter, hot air passes through said mixer 19 and emerges through the downstream end 19V thereof to flow around inside the annular chamber 18 and heat the leading edge 16.

At least one orifice 21 is provided in said leading edge 16 to remove hot air which has flowed around inside the leading edge 16 to the open air (arrow 22). This orifice may just as easily be provided in the internal partition 17.

In actual fact, the orifice 21 is calibrated to allow only some 22 of the hot air flowing through the annular chamber 18 to be removed to the outside, the rest 23 of said stream being recirculated in said annular chamber 18.

Thus, the recirculated part of the stream 23, which was previously injected by the injector 12 and the temperature of which has been lowered through transfer to the leading edge 16, enters the mixer 19 through said upstream end 19M and there mixes with the hotter stream 20 being injected by the injector 12. It is therefore the stream 24 which results from the mixing of the hot stream 20 and the less-hot recirculated stream 23 which leaves the mixer 19 through the downstream end 19V to sweep through the annular chamber 18.

Figure 3:
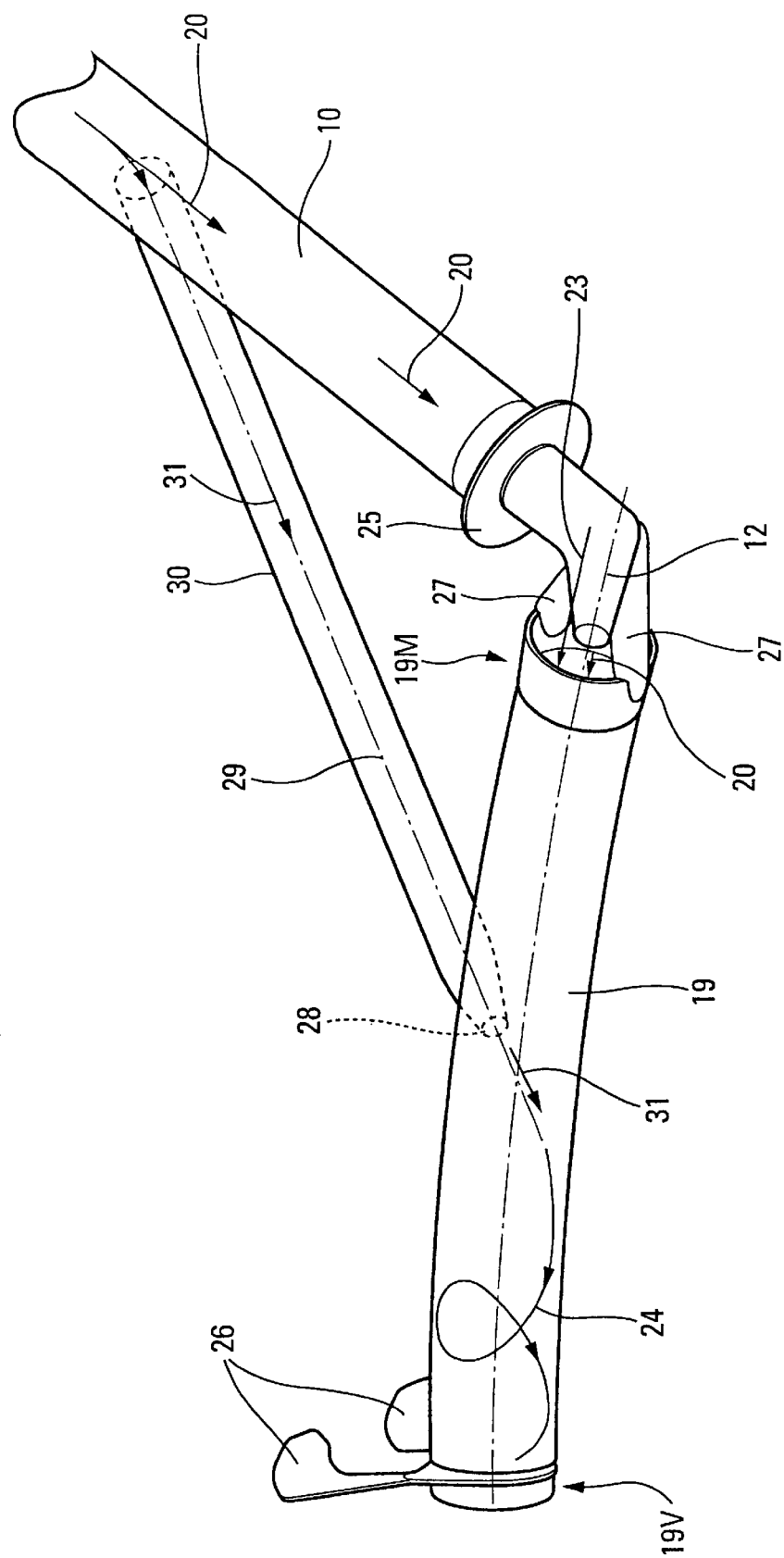
FIG. 3 illustrates, schematically in perspective, one first embodiment of the mixer according to the present invention.

FIG. 3 depicts one exemplary embodiment of the mixer 19, comprising means for inducing swirl in the stream of mixer 24. In this figure, the tubular mixer 19 is supported in the annular chamber 18 (not depicted) by lugs 26 provided at its downstream end 19V and by lugs 27 provided at its upstream end 19M and secured to the injector 12, itself fixed to the partition 17 by the flange 25.

The mixer 19 in FIG. 3 additionally comprises at least one auxiliary hot air injector 28 arranged laterally with respect to said mixer 19 between the ends 19M and 19V thereof. The axis 29 of said auxiliary injector 28 may be inclined with respect to the mixer 19. This auxiliary injector 28 is supplied with hot air by a tapping 30 off the supply pipe 10, tapping a stream of hot air 31 therefrom.

The stream of hot air 31, induces swirl in the stream of mixture 24, which begins to swirl and therefore sweeps through the annular chamber 18 in the manner of a cyclone.

Figure 4:
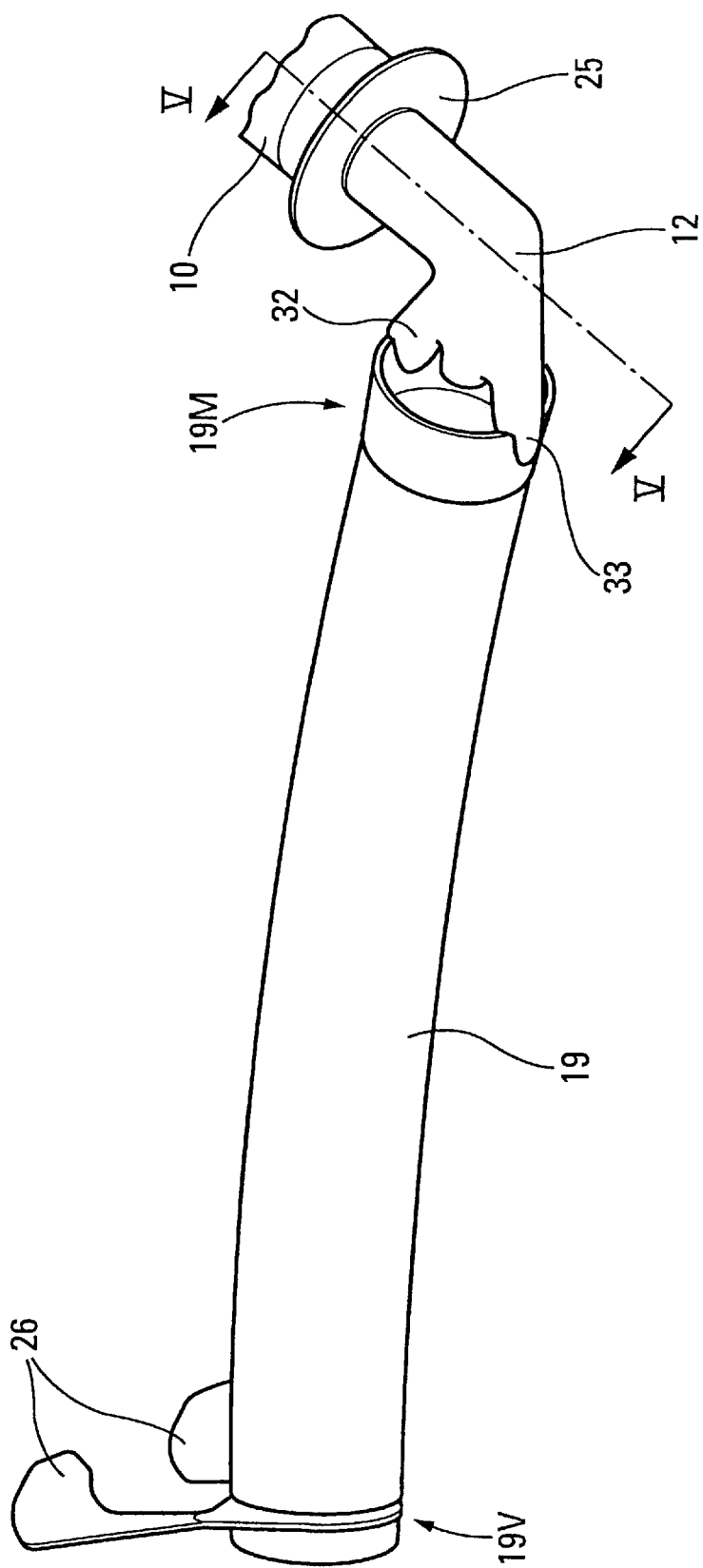
FIG. 4 illustrates, schematically in perspective, another embodiment of the mixer according to the present invention.
Figure 5:
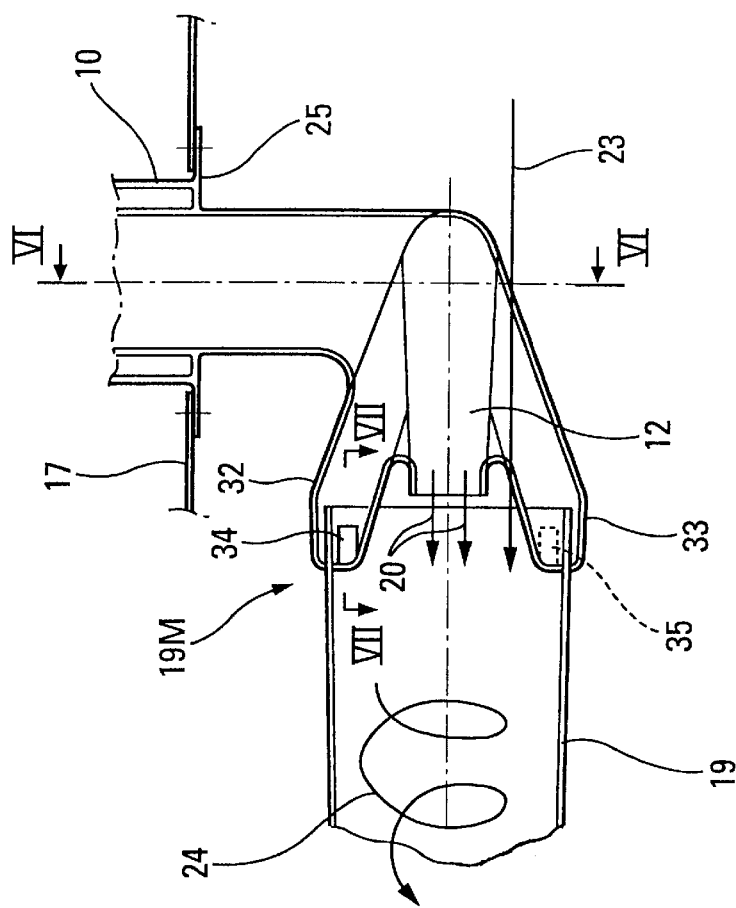
FIG. 5 is an axial part section through the injector of FIG. 4, on the line V—V thereof.
Figure 7:
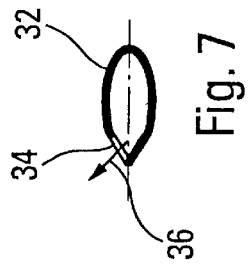
FIGS. 6 and 7 are sections on the lines VI—VI and VII—VII, respectively, of FIG. 5.

In the alternative form of embodiment in FIGS. 4 and 7, the mixer 19 is provided with an injector 12, provided with two lateral blowing horns 32 and 33, supplied with hot gas by the pipe 10, in common with the injector 12. The horns 32 and 33 additionally serve to attach the mixer 19 to the chamber 18 (not depicted) in collaboration with the lugs 26.

Figure 6:
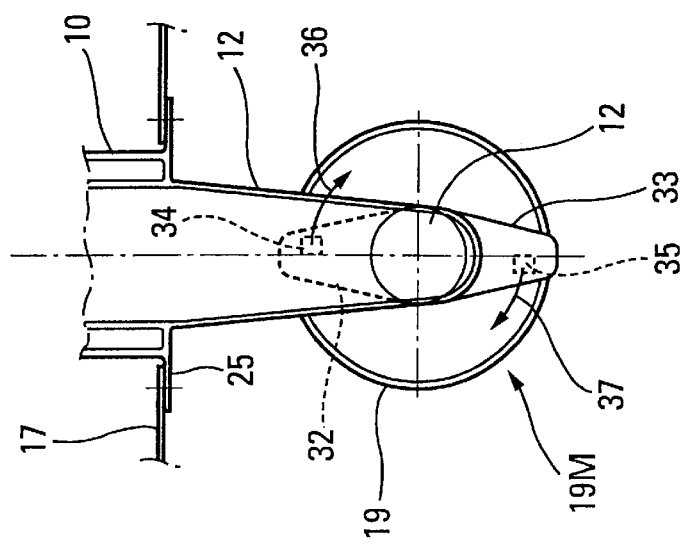

The lateral horns open into the upstream end 19M of the mixer 19 via eccentric and oblique orifices 34 and 35 forming auxiliary injectors and emitting jets of hot air 36 and 37 capable of inducing swirl in the stream of mixture 24, as illustrated in FIG. 6.

Although FIGS. 4 to 7 depict two blowing horns, it goes without saying that the number thereof could either be equal to 1 or be greater than 2.

What is claimed is:

1. An air inlet cowl for a jet engine, particularly for an aircraft, provided with means for de-icing its leading edge and for this purpose comprising:

a hollow leading edge delimiting an internal annular peripheral chamber, closed by an internal partition and provided with at least one orifice placing said annular chamber in communication with the outside;

a hot air supply pipe for being connected, at its rear end away from said leading edge, to a pressurized hot air circuit and, at its front end towards said leading edge, to an injector injecting a stream of said pressurized hot air into said annular chamber so that said stream of hot air flows through and heats said annular chamber before escaping to the outside through said communication orifice, wherein said communication orifice is calibrated to allow only some of said stream of hot air flowing through said annular chamber to escape to the outside, the rest of said stream being recirculated in this annular chamber; and a mixer arranged inside said annular chamber for forming, at each moment, a mixture of the stream of hot air being injected by said injector with the part of said previously injected stream of air that is recirculating, said mixer having two open ends and, at its upstream end arranged facing said injector, receiving both said stream of hot air being injected and said part of said stream of air being recirculated, and delivering said mixed stream at its downstream end.

2. The air inlet cowl as claimed in claim 1, wherein said mixer is curved into a portion of an annulus, to correspond to the shape of said internal annular peripheral chamber.

3. An air inlet cowl for a jet engine, particularly for an aircraft, provided with means for de-icing its leading edge and for this purpose comprising:
- a hollow leading edge delimiting an internal annular peripheral chamber, closed by an internal partition and provided with at least one orifice placing said annular chamber in communication with the outside;
- a hot air supply pipe for being connected, at its rear end away from said leading edge, to a pressurized hot air circuit and, at its front end towards said leading edge, to an injector that injects a stream of said pressurized hot air into said annular chamber so that said stream of hot air flows through and heats said annular chamber before escaping to the outside through said communication orifice, wherein said communication orifice of said annular chamber being is calibrated to allow only some of said stream of hot air flowing through said annular chamber to escape to the outside, the rest of said stream being recirculated in this annular chamber; and
- a mixer arranged inside said annular chamber for forming, at each moment, a mixture of the stream of hot air being injected by said injector with the part of said previously injected stream of air that is recirculating, wherein said mixer comprises means for causing said stream of hot air to effect a swirling rotation in the manner of a cyclone such that the mixture not only rotates about the axis of the annular chamber, but additionally swirls about itself while rotating through the chamber.

4. The air inlet cowl as claimed in claim 3, wherein said means for causing said mixture of stream to swirl use the energy of the hot air in said supply pipe.

5. An air inlet cowl air inlet cowl for a jet engine, particularly for an aircraft, provided with means for de-icing its leading edge and for this purpose comprising:
- a hollow leading edge delimiting an internal annular peripheral chamber, closed by an internal partition and provided with at least one orifice placing said annular chamber in communication with the outside;
- a hot air supply pipe for being connected, at its rear end away from said leading edge, to a pressurized hot air circuit and, at its front end towards said leading edge, to an injector that injects a stream of said pressurized hot air into said annular chamber so that said stream of hot air flows through and heats said annular chamber before escaping to the outside through said communication orifice, wherein said communication orifice of said annular chamber being is calibrated to allow only some of said stream of hot air flowing through said annular chamber to escape to the outside, the rest of said stream being recirculated in this annular chamber; and
- a mixer arranged inside said annular chamber for forming, at each moment, a mixture of the stream of hot air being injected by said injector with the part of said previously injected stream of air that is recirculating, wherein said means for causing said mixture of steam to swirl (i) comprise at least one auxiliary hot air injector arranged laterally and tangentially with respect to said mixer, downstream of the injector and (ii) use the energy of the hot air in said supply pipe.

6. The air inlet cowl as claimed in claim 5, wherein said auxiliary injector is supplied with hot air by a tapping off said supply pipe.

7. An air inlet cowl air inlet cowl for a jet engine, particularly for an aircraft, provided with means for de-icing its leading edge and for this purpose comprising:
- a hollow leading edge delimiting an internal annular peripheral chamber, closed by an internal partition and provided with at least one orifice placing said annular chamber in communication with the outside;
- a hot air supply pipe for being connected, at its rear end away from said leading edge, to a pressurized hot air circuit and, at its front end towards said leading edge, to an injector that injects a stream of said pressurized hot air into said annular chamber so that said stream of hot air flows through and heats said annular chamber before escaping to the outside through said communication orifice, wherein said communication orifice of said annular chamber being is calibrated to allow only some of said stream of hot air flowing through said annular chamber to escape to the outside, the rest of said stream being recirculated in this annular chamber; and
- a mixer arranged inside said annular chamber for forming, at each moment, a mixture of the stream of hot air being injected by said injector with the part of said previously injected stream of air that is recirculating, wherein said means for causing the mixture of steam to swirl (i) comprise at least one auxiliary hot air injector arranged in the region of the injector and (ii) use the energy of the hot air in said supply pipe.

8. The air inlet cowl as claimed in claim 7, wherein said auxiliary injector is supplied with hot air directly by said supply pipe.

9. The air inlet cowl as claimed in claim 8, wherein said auxiliary injector forms an integral part of the aforesaid injector.

* * * * *